(12) United States Patent
Park et al.

(10) Patent No.: US 8,330,044 B2
(45) Date of Patent: Dec. 11, 2012

(54) INSULATION MATERIAL FOR ELECTRIC CABLES WITH SUPERIOR FLEXIBILITY AND CROSSLINKABILITY AND ELECTRIC CABLE PRODUCED WITH THE SAME

(75) Inventors: Do-Hyun Park, Anyang-si (KR); Min-Su Jung, Anyang-si (KR)

(73) Assignee: LS Cable & System Ltd., Anyang-si, Gyeonggi-do (KR)

( * ) Notice: Subject to any disclaimer, the term of this patent is extended or adjusted under 35 U.S.C. 154(b) by 414 days.

(21) Appl. No.: 12/645,444

(22) Filed: Dec. 22, 2009

(65) Prior Publication Data
US 2010/0212931 A1    Aug. 26, 2010

(30) Foreign Application Priority Data
Feb. 20, 2009    (KR) .................. 10-2009-0014357

(51) Int. Cl.
*H01B 3/30* (2006.01)
*H01B 3/44* (2006.01)
*H01B 7/295* (2006.01)
*C08F 251/00* (2006.01)
*C08F 253/00* (2006.01)
*C08F 255/00* (2006.01)
*C08F 257/00* (2006.01)
*C08F 10/00* (2006.01)
*C08F 110/00* (2006.01)
*C08F 210/00* (2006.01)
*C08F 8/00* (2006.01)

(52) U.S. Cl. .................. 174/110 R; 525/263; 525/333.8

(58) Field of Classification Search .................. None
See application file for complete search history.

(56) References Cited

U.S. PATENT DOCUMENTS

| | | | | |
|---|---|---|---|---|
| 5,824,759 A * | 10/1998 | Watanabe et al. | ............. | 526/348 |
| 6,747,114 B2 * | 6/2004 | Karandinos et al. | ....... | 526/348.2 |
| 8,263,707 B2 * | 9/2012 | Datta et al. | ..................... | 525/191 |
| 2008/0296041 A1* | 12/2008 | Fukuchi et al. | ........... | 174/110 R |

FOREIGN PATENT DOCUMENTS

| | | |
|---|---|---|
| KR | 10-2008-0090804 | 10/2008 |
| WO | WO 2005/123828 | 12/2005 |

* cited by examiner

*Primary Examiner* — Jayprakash N Gandhi
*Assistant Examiner* — Dion Ferguson
(74) *Attorney, Agent, or Firm* — Sherr & Jiang, PLLC

(57) ABSTRACT

An insulation material for electric cables includes an ethylene-alpha olefin copolymer with a melting point of 30° C. to 90° C.; and 0.5 to 20 parts by weight of a crosslinking agent based on 100 parts by weight of the ethylene-alpha olefin copolymer. The insulation material composition is based on a non-crystalline ethylene copolymer, and thus is flexible and satisfies tensile strength and insulation characteristics in conformity with the industrial standards. The insulation material composition is suitable for an insulation of electric cables for power, control and signaling that are installed in narrow spaces, in particular, electric cables for ships.

7 Claims, 1 Drawing Sheet

1. Conductor
2. Insulation (Crystalline resin with m.p. > 90°C used)
3. Bedding
4. Braided shield
5. Sheath 1. Conductor
2. Insulation (Inventive resin with m.p. ≤ 90°C used)
3. Bedding
4. Braided shield
5. Sheath

INSULATION MATERIAL FOR ELECTRIC CABLES WITH SUPERIOR FLEXIBILITY AND CROSSLINKABILITY AND ELECTRIC CABLE PRODUCED WITH THE SAME

BACKGROUND OF THE INVENTION

1. Field of the Invention

This application claims priority to Korean Patent Application No. 10-2009-0014357, filed on Feb. 20, 2009, the entirety of which is incorporated herein by reference.

The present invention relates to a polymer composition for an insulation material of electric cables. In particular, the present invention relates to an ethylene copolymer-based composition for an insulation material.

2. Description of the Related Art

When manufacturing an insulation of electric cables bent to be installed in narrow spaces, for example electric cables for ships, it is important to consider all of electrical properties such as insulation resistivity and voltage resistant characteristics, mechanical properties such as high tensile strength, and heat resistance for protection from fire, which are required for an insulation.

Conventionally, a crosslinked polyethylene (XLPE)-based insulation having crystallinity has been used to ensure said electrical, mechanical and chemical characteristics required for electric cables installed in narrow spaces such as ships. Crystalline polyethylene is mainly used to ensure a required level of tensile strength. Typically, crystalline XLPE may be, for example, low density polyethylene (LDPE), linear low density polyethylene (LLDPE) or middle low density polyethylene (MDPE). These are crystalline resins of which a melting point is generally 100° C. or above. Conventional insulated electric cables comprise an insulation around a conductor, manufactured using said crystalline polymer-based composition, and a sheath formed by extruding a sheath material and crosslinking in an in-line manner under high temperature and high pressure conditions (e.g., pressure of 8 bar and temperature of 180° C.). However, during crosslinking of sheath material under high temperature and high pressure conditions, the insulation may melt due to heat of a vulcanization tube and be deformed and pressed into lumps due to ambient high pressure steam. When the insulation is pressed into lumps, the insulation cannot maintain a circular shape basically required, resulting in a quality problem associated with the basic appearance. And, it is impossible to ensure the electrical properties required very importantly for the insulation, and thus, if a high-tension electricity is applied, the insulation is broken.

To solve the problems, conventional techniques have been suggested in which insulated electric cables are produced with a crystalline resin by crosslinking a sheath in a batch manner, not in an in-line manner, after extrusion of the sheath. The crosslinking in the batch manner is performed at lower temperature than a melting point where thermal deformation does not occur. However, the techniques disadvantageously require a very long time, for example 3 hours or longer to produce radicals required for crosslinking because a crosslinking agent is dissolved at a low temperature.

Crystalline polyethylene has strong attractive forces between molecules, and thus is advantageous in terms of tensile strength, but has high flexural strength at normal temperature. For this reason, electric cables having an insulation made from crystalline polyethylene are not flexible. In electric cables (or cables) for control and signaling, most of a plurality of electric cables are complicatedly installed in cabinet panels, distributing boards or control boxes. It is very difficult to strip coatings from and branch off said electric cables while connected in narrow spaces so as to change connection. It is more difficult to do so because a majority of electric cables (or cables) for power, control, signaling and so forth have an inner metal line, i.e., a braided shield to prevent deformation caused by tension and lateral pressure applied thereto during installation. Thus, conventional electric cables are difficult to install due to low flexibility and need much energy to bend in narrow spaces.

Meanwhile, a crystalline resin is resistant against external shocks, but deforms when shocks exceeding a predetermined level are applied. Higher crystallinity results in higher density. In this case, shock resistance and flexibility at low temperature reduces, and elasticity is low. Thus, due to low elasticity, once a crystalline resin deforms, it cannot restore to the original shape but remains deformed. When applied to cables, a crystalline resin is generally extruded over a conductor to form a circular shape in cross section. If the circular shape of the insulation deforms due to external shocks, the insulation cannot retain the insulation characteristics of XLPE required for cables, causing electrical problems such as dielectric breakdown and so forth. The dielectric breakdown involves high temperature, and consequently, a fire breaks out at the insulation, possibly resulting in conflagration.

In conclusion, insulated electric cables having a crystalline polyethylene-based insulation suffer sacrifice of productivity during a crosslinking process, and need much efforts, techniques and costs to install. And, they have low elasticity, and thus are difficult to restore to the original shape, which acts as one of safety-threatening factors.

SUMMARY OF THE INVENTION

Crystalline resin-based insulation materials have been used in electric cables for power, control, signaling and so forth that are installed in narrow spaces to meet the mechanical strength requirements. The present invention is designed to provide a polymer insulation material having flexibility while satisfying the mechanical properties and insulation characteristics possessed by conventional insulation materials for electric cables, and electric cables produced with the same.

To achieve the object of the present invention, a non-crystalline resin-based insulation material according to the present invention comprises an ethylene-alpha olefin copolymer and 0.5 to 20 parts by weight of a crosslinking agent based on 100 parts by weight of the ethylene-alpha olefin copolymer, wherein the copolymer is a polymer with a melting point of 30° C. to 90° C., obtained by polymerization at a molar ratio of ethylene to an alpha olefin monomer of 90%:10% to 55%:45%.

ADVANTAGEOUS EFFECTS

Conventional electric cables having a crystalline resin-based insulation do not satisfy the electrical property requirements because the crystalline resin-based insulation deforms during extrusion and crosslinking of sheath material under high temperature and high pressure conditions. However, the present invention overcomes the conventional limits. Electric cables having an insulation manufactured using a low-melting ethylene copolymer-based composition according to the present invention have lower modulus and higher flexibility, that may be represented as rigidity and flexural strength, than the conventional electric cables. Thus, the electric cables of the present invention are suitable as, in particular, electrical cables installed in narrow spaces.

BEST MODE

Figure 1:
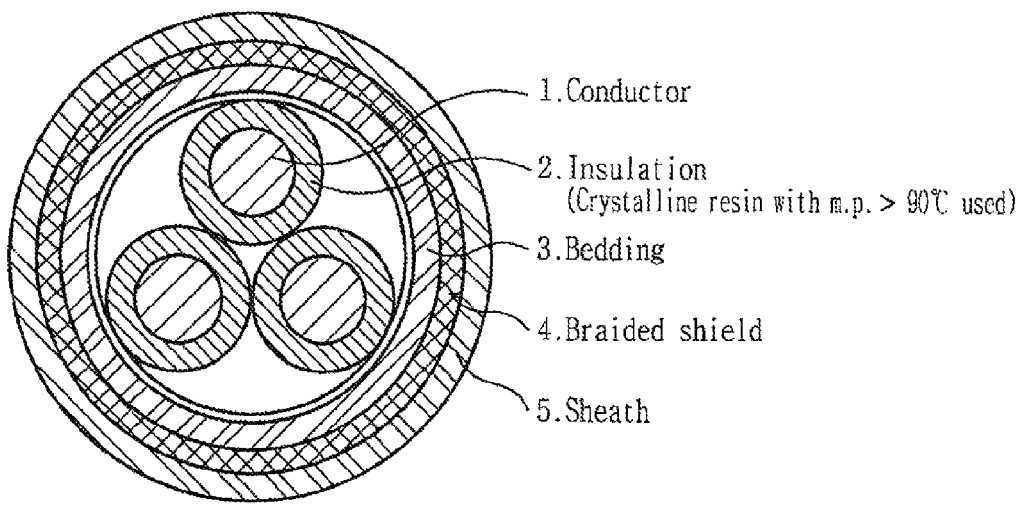
FIG. 1 is a cross-sectional view of a conventional electric cable, in which an inner conductor is surrounded by an insulation, a bedding, a braided shield and a sheath in order, and the insulation is made from a crystalline resin with a melting point more than 90° C.

Hereinafter, the present invention will be described in detail with reference to the accompanying drawings. The present invention provides an insulation composition suitable for an insulation material of electric cables for power, control, signaling and so forth that are installed in narrow spaces, and an electric cable produced with the same. The insulation composition of the present invention comprises an ethylene-alpha olefin copolymer and 0.5 to 20 parts by weight of a crosslinking agent based on 100 parts by weight of the ethylene-alpha olefin copolymer.

The ethylene-alpha olefin copolymer of the present invention is characterized by a melting point of 30° C. to 90° C. It is an object of the present invention to provide high flexibility by using a non-crystalline resin-based insulation material instead of a conventional crystalline resin-based insulation material with a melting point more than 90° C., as well as to secure equivalent tensile strength and insulation characteristics to those of the conventional crystalline resin-based insulation material. To achieve the object, the present invention uses a non-crystalline resin, for example, an ethylene-alpha olefin copolymer with a melting point of 30° C. to 90° C. or a composite resin comprising at least two types of copolymers with the same or different melting points within the said melting point range.

Preferably, the ethylene-alpha olefin copolymer of the present invention includes, for example, ethylene-butene, ethylene-octene and ethylene-propylene.

In the composition of the present invention, a proper content of an ethylene monomer used for polymerization of the ethylene-alpha olefin copolymer (i.e., a weight ratio of ethylene:alpha olefin used for polymerization) is 90:10 to 55:45 parts by weight. The ratio is applied to both the ethylene copolymer resin composition and the composite resin composition. Generally, the melting point is influenced the most by the ratio between ethylene and an alpha olefin monomer. The higher content of ethylene results in higher crystallinity, and consequently higher density. In the case that the content of ethylene is more than 90 parts by weight, the resin has similar characteristics to conventional crystalline resins (e.g., LDPE, LLDPE). To the contrary, the higher the content of alpha olefin monomer, the lower the melting point. When the content of the ethylene monomer is within said range relative to the whole ethylene-alpha olefin copolymer of a single or composite configuration, the resin has low crystalline content, and consequently is flexible and elastic. Thus, the resin has excellent shock resistance and flexibility, and an insulation manufactured using the resin does not deform when extruding and crosslinking a sheath under high temperature and high pressure conditions, and is very advantageous to satisfy the electrical properties. If an ethylene-alpha olefin copolymer obtained by polymerization with less than 55 parts by weight of an ethylene monomer is used, the resin has an insufficient crystalline content, and as a result, does not meet a tensile strength of 1.25 kgf/mm$^2$ or more and an elastic modulus of 4.5 N/mm$^2$ at 150% elongation, required for an insulation material. Meanwhile, if the content of an ethylene monomer is more than 90 parts by weight, the resin has high crystallinity and consequently lower flexibility. Further, when extruding and crosslinking a sheath under high temperature and high pressure conditions, crystalline of the insulation may melt and deform. As a result, in severe instances, the insulation is pressed into lumps, resulting in bad appearance and failure to satisfy the electrical properties. And, the resin cannot satisfy an elastic modulus of 5 N/mm$^2$ or less at 10% elongation and Shore A hardness of 90 or less at normal temperature.

In the insulation material composition of the present invention, the crosslinking agent is included at an amount of 0.5 to 20 parts by weight based on 100 parts by weight of the ethylene-alpha olefin. The insulation material of the present invention uses a non-crystalline resin, and thus advantageously allows not only radiation crosslinking and water crosslinking but also chemical crosslinking in an in-line manner when producing insulated electric cables. For example, the insulation composition of the present invention allows to finish crosslinking a sheath in about several minutes under high temperature and high pressure conditions, so that thermal deformation of an insulation can be minimized.

In the case of chemical crosslinking, the preferred crosslinking agent may be a peroxide-based crosslinking agent. For example, the crosslinking agent may include di-(2,4-dichlorobenzoyl)-peroxide, dibenzoyl peroxide, tert-butylperoxybenzoate, 1,1-di-(tert-butylperoxy)-3,3,5-trimethylcyclohexane, dicumyl peroxide, tert-butylcumyl peroxide, di-(2-tert-butyl-peroxyisopropyl)benzene, 2,5-dimethyl-2,5-di-(tert-butylperoxy)-hexane, di-tert-butylperoxide, 2,5-dimethyl-2,5-di(tert-butylperoxy)hexyme-3 and so forth. And, the crosslinking agent may include mixtures comprising at least two crosslinking agents.

If the crosslinking agent is included less than 0.5 parts by weight, the minimum limit, it results in insufficient crosslinking, which makes it difficult to ensure the desired material properties such as tensile strength and elastic modulus at 150% elongation. Meanwhile, if the crosslinking agent is included more than 20 parts by weight, a crosslinking reaction progresses in a short time, and consequently, initial crosslinking may be progressed during a compounding or extruding process due to an increase in temperature, thereby causing problems in processability. And, it results in an excessive amount of by-products of the crosslinking reaction, thereby causing a low volume resistivity of the insulation material. As a result, electric cables produced with said material may undergo deterioration in electrical properties such as breakdown voltage. And, the electric cables may have the reduced elongation.

Although the specification of the present invention shows chemical crosslinking of a polymer by basically using peroxide, the polymer resin composition of the present invention can have necessary characteristics through various methods such as radiation crosslinking using radioactive rays, water crosslinking using a silane compound or ultraviolet ray radiation. In the case of crosslinking other than chemical crosslinking, an ordinary person skilled in the art can use a proper other crosslinking agent. Thus, the detailed description of the crosslinking agent is omitted herein.

An electric cable having an insulation manufactured using the insulation material of the present invention comprising a non-crystalline ethylene-alpha olefin resin with a melting point of 30 to 90° C. and a crosslinking agent as mentioned above has excellent material properties including a tensile strength of 12.5 N/mm$^2$ or more at normal temperature, an elastic modulus of 5 N/mm$^2$ or less at 10% elongation and Shore A hardness of 90 or less at normal temperature.

The insulation material composition of the present invention may further comprise an additive such as a secondary crosslinking agent, an antioxidant, an inorganic additive, a lubricant and so on.

The secondary crosslinking agent improves the crosslinking rate and crosslinking density together with an organic peroxide-based crosslinking agent, and includes an unsaturated organic compound having a plurality of functional groups, for example trimethylolpropanetrimethacrylate, liquid-type polybutadiene, and triallyl isocyanurate. Preferably, the content of the secondary crosslinking agent is 1 to 10 parts by weight based on 100 parts by weight of the ethylene-alpha olefin copolymer. If the content of the secondary crosslinking agent is less than the minimum limit, it results in reduction of crosslinking density, and consequently low tensile strength and heat resistance. If the content of the secondary crosslinking agent is more than 10 parts by weight, it results in excessive radicals involved in a crosslinking reaction, causing scorching which make the appearance poor and deteriorates the material properties of products.

The antioxidant is used to ensure heat resistant characteristics, and may typically include a phenol-based antioxidant and an amine-based antioxidant singularly or in combination thereof. In the insulation material composition for electric cables according to the present invention, the content of the antioxidant is preferably 1 to 5 parts by weight based on 100 parts by weight of the ethylene-alpha olefin. In the case of a phenol-based or amine-based antioxidant, a benzoimidazole-based antioxidant may be additionally used for better heat resistant characteristics.

The inorganic additive is added to improve the tensile strength and may typically include clay and talc singularly or in combination thereof. Preferably, the clay is surface-treated with stearic acid ester, titanic acid or silane to improve compatibility with the polymer resin. The talc improves the rigidity of the insulation due to its plate-type structure, and because it is neutral, exhibits excellent electrical insulating properties.

As mentioned above, in the insulation material composition for electric cables according to the present invention, the lubricant may be additionally used to improve processability, and may include high molecular weight wax, low molecular weight wax, polyolefin wax, paraffin wax, paraffin oil, stearic acid, metallic soap, organic silicone, fatty acid ester, fatty acid amide, aliphatic alcohol, fatty acid and so on. Preferably, the content of the lubricant is 0.5 to 5 parts by weight based on 100 parts by weight of the base resin. If the content of the lubricant is less than the minimum limit, it results in an increase in viscosity of materials, so that a load is applied during processing. If the content of the lubricant is more than the maximum limit, it is unfavorable because it results in reduction in tensile strength and heat resistance.

Figure 2:
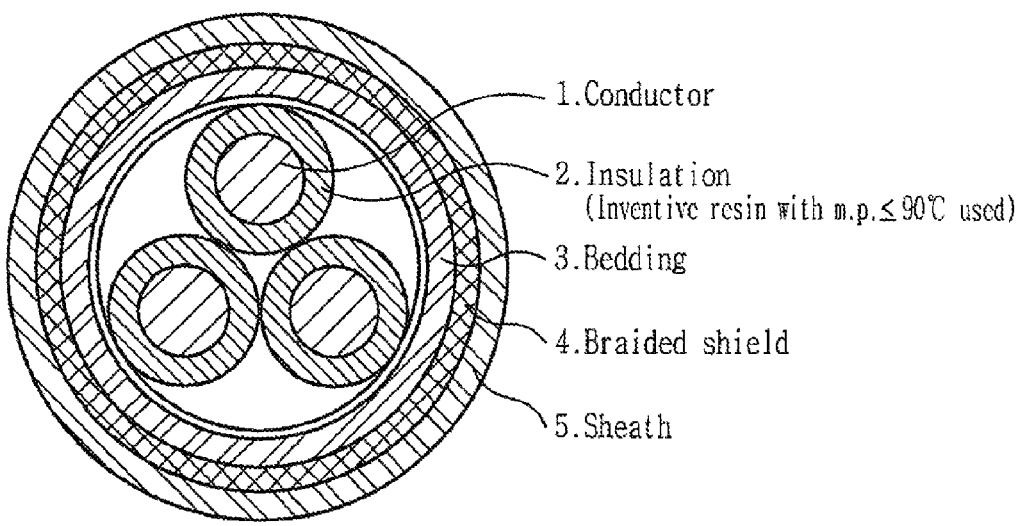
FIG. 2 is a cross-sectional view of an electric cable according to an exemplary embodiment of the present invention, of which structure is similar to that of the conventional electric cable, and in which the insulation is made from a non-crystalline resin with a melting point of 90° C. or lower.

FIGS. 1 and 2 are cross-sectional views illustrating the structure of insulated electric cables according to the prior art and present invention, respectively. A method for manufacturing an insulation of an insulated electric cable comprising mix-milling and crosslinking the insulation material composition of the present invention is well known, and its detailed description is omitted herein. Referring to FIG. 1 showing a cable structure of a basic technique, each inner conductor 1 is surrounded by an insulation 2 made from a crystalline resin with a melting point more than 90° C., for example LDPE, LLDPE or MDPE. A plurality of conductors 1 each surrounded by the insulation 2 are wholly surrounded by a bedding 3 made from a thermosetting material. The bedding 3 may be not formed. An outer surface of the bedding 3 is surrounded by a braided shield 4 made from copper-plated or zinc-plated copper. The braided shield 4 may be not formed. Finally, an outer surface of the braided shield 4 is surrounded by a sheath 5 made from a thermosetting material.

FIG. 2 is a cross-sectional view of an insulated electric cable, in which an insulation is replaced by a non-crystalline ethylene-alpha olefin resin-based insulation 2 with a melting point of 30 to 90° C. in the structure of the conventional insulated electric cable.

MODE FOR THE INVENTION

Hereinafter, the present invention will be described in detail through examples. The description proposed herein is just a preferable example for the purpose of illustrations only, not intended to limit the scope of the invention, so it should be understood that other equivalents and modifications could be made thereto without departing from the spirit and scope of the invention.

For comparison in performance between the present invention and the prior art, insulation material compositions according to examples and comparative examples were prepared, and specimens for testing were manufactured using the same. According to composition shown in the following table 1, ingredients were mix-milled in an open roll of about 100° C. and molded using a press of 170° C. for 20 minutes, so that a specimen for measuring the material properties was manufactured.

As shown in FIG. 2, an electric cable was produced with the polymer composition prepared according to Table 1. An insulation 2 surrounding a conductor was manufactured by extruding and then crosslinking under about 200° C. condition while maintaining an inner vapor pressure of a vulcanization tube to 20 bar or more. A bedding 3 and a sheath 5 were formed on a plurality of conductors, each surrounded by the insulation 2, by crosslinking under about 140 to 160° C. condition while maintaining the inner vapor pressure of the vulcanization tube to 6 bar to 8 bar, so as to prevent deformation or conglomeration of the insulation 2.

The insulation of the produced electric cable was evaluated with regard to mechanical properties at normal temperature, mechanical properties after heating, elastic modulus, secant modulus, hardness, torsional rigidity, flexibility and deformation.

TABLE 1

| Unit | Examples | | | | | Comparative examples | |
|---|---|---|---|---|---|---|---|
| (parts by weight) | 1 | 2 | 3 | 4 | 5 | 1 | 2 |
| Ethylene-Butene 1 | 100 | | | | | | |
| Ethylene-Butene 2 | | 100 | | | | | |
| Ethylene-Octene 1 | | | 100 | | | | |
| Ethylene-Octene 2 | | | | 100 | | | |
| Ethylene-Propylene | | | | | 100 | | |
| LDPE | | | | | | 100 | |
| LLDPE | | | | | | | 100 |

TABLE 1-continued

| Unit | Examples | | | | | Comparative examples | |
|---|---|---|---|---|---|---|---|
| (parts by weight) | 1 | 2 | 3 | 4 | 5 | 1 | 2 |
| Crosslinking agent | | | 3 | | | | 5 |

Ethylene-Butene 1: copolymer of ethylene and 1-butene, with a density of 0.866 g/cm³ and a melting point of 50° C.
Ethylene-Butene 2: copolymer of ethylene and 1-butene, with a density of 0.890 g/cm³ and a melting point of 75° C.
Ethylene-Octene 1: copolymer of ethylene and 1-octene, with a density of 0.868 g/cm³ and a melting point of 55° C.
Ethylene-Octene 2: copolymer of ethylene and 1-octene, with a density of 0.885 g/cm³ and a melting point of 77° C.
Ethylene-Propylene: copolymer of ethylene-propylene with a density of 0.875 g/cm³ and a melting point of 55° C.
LDPE: low density polyethylene with a melting point of 109° C.
LLDPE: linear low density polyethylene with a melting point of 119° C.
Crosslinking agent: dicumyl peroxide The above-mentioned insulation material specimens according to examples 1 to 5 and comparative examples 1 and 2 were tested to evaluate the mechanical properties. The evaluation results are shown in the following table 2.

A) Characteristics at normal temperature: Tensile strength and elongation at normal temperature were measured. The preferred tensile strength is 1.25 N/mm² or more and the preferred elongation is 200% or more when measured at tensile rate of 250 mm/min according to IEC 60811-1-1.

B) Elastic modulus: The preferred tensile strength is 4.5 N/mm² or more at elongation of 150% when measured at tensile rate of 250 mm/min according to IEC 60811-1-1.

C) Secant modulus: The preferred secant modulus is 5 N/mm² or less at elongation of 10% that is within a low elongation range.

D) Hardness: The preferred Shore A hardness is 90 or less at normal temperature.

E) Torsional rigidity: The preferred torsional rigidity is 40 MPa or less when measured according to ASTM D1043 specification.

F) Deformation: After crosslinking a sheath under high temperature (150 to 210° C.) and high pressure (6 to 20 bar) conditions relative to the insulation, deformation of the insulation was observed. After crosslinking was completed, a pressed depth less than 0.2 mm was evaluated as "no deformation", and a pressed depth of 0.2 mm or more was evaluated as "severe deformation".

TABLE 2

| | | Examples | | | | | Comparative examples | |
|---|---|---|---|---|---|---|---|---|
| | | 1 | 2 | 3 | 4 | 5 | 1 | 2 |
| Characteristics at normal temperature | Tensile strength (N/mm²) | 17.8 | 18.8 | 18.3 | 17.6 | 19 | 23 | 25 |
| | Elongation (%) | 586 | 612 | 648 | 655 | 678 | 645 | 622 |
| Elastic modulus (N/mm²) | | 10.1 | 11.4 | 10.8 | 12.3 | 11.7 | 15 | 17 |
| Secant modulus (N/mm²) | | 3.4 | 4.2 | 3.3 | 4.1 | 3.7 | 7.3 | 9.5 |
| Hardness (Shore A) | | 75 | 78 | 81 | 82 | 84 | 95 | 96 |
| Torsional rigidity (MPa) | | 8 | 12 | 14 | 21 | 23 | 71 | 86 |
| Deformation | | No deformation | | | | | Severe deformation | |

Examples 1 to 5

The physical properties of an ethylene-alpha olefin insulation material with a melting point lower than 90° C. were evaluated, and according to the evaluation results, it is found that examples 1 to 5 were lower than conventional resin compositions in elastic modulus at normal temperature, secant modulus in the low elongation range and torsional rigidity. That is, it is found that insulated electric cables and cables in combination with the insulated electric cables which were produced with the insulation material of the present invention, are more flexible and easier to install than electric cables produced with conventional insulation material. And, the insulation material of the present invention does not bring about deformation of an insulation after extrusion of a sheath under high temperature and high pressure conditions and followed by crosslinking.

Comparative Examples 1 and 2

The insulation material using a crystalline resin with higher melting point was evaluated in terms of physical properties, and according to the evaluation results, it is found that comparative examples 1 and 2 were higher than the polymer resin composition of the present invention in elastic modulus at normal temperature, and secant modulus in the low elongation range and torsional rigidity. In conclusion, the insulation material using a conventional crystalline resin has lower flexibility, and accordingly, an electric cable produced with the same has lower flexibility.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An insulation material for electric cables, comprising:
   an ethylene-alpha olefin copolymer; and
   0.5 to 20 parts by weight of a crosslinking agent per 100 parts by weight of the ethylene-alpha olefin copolymer,
   wherein the ethylene-alpha olefin copolymer is a polymer with a melting point in a range between 30° C. to 90° C., obtained by polymerization at a weight ratio of ethylene to an alpha olefin monomer in a range between 90%: 10% to 55%:45%.

2. The insulation material for electric cables according to claim 1, wherein the ethylene-alpha olefin copolymer is a polymer selected from the group consisting of ethylene-butene, ethylene-octene, ethylene-propylene, and mixtures thereof.

3. The insulation material for electric cables according to claim 1, wherein the crosslinking agent is an organic peroxide crosslinking agent.

4. An insulated electric cable, comprising:
   a conductor;
   an insulation surrounding the conductor; and
   a sheath surrounding the insulation,
   wherein the insulation is made from an insulation material for electric cables comprising an ethylene-alpha olefin copolymer; and 0.5 to 20 parts by weight of a crosslinking agent per 100 parts by weight of the ethylene-alpha olefin copolymer,
   wherein the ethylene-alpha olefin copolymer is a polymer with a melting point in a range between 30° C. to 90° C., obtained by polymerization at a weight ratio of ethylene to an alpha olefin monomer in a range between 90%:10% to 55%:45%.

5. The insulated electric cable according to claim 4, wherein the insulation has a tensile strength of at least 12.5 N/mm² at room temperature, an elastic modulus of not more than 5 N/mm² at 10% elongation, and Shore A hardness of not more than 90 at room temperature.

6. The insulated electric cable according to claim 4, wherein the ethylene-alpha olefin copolymer is a polymer selected from the group consisting of ethylene-butene, ethylene-octene, ethylene-propylene, and mixtures thereof.

7. The insulated electric cable according to claim 4, wherein the crosslinking agent is an organic peroxide crosslinking agent.

* * * * *